G. W. COOPER.
SHOCK ABSORBER.
APPLICATION FILED SEPT. 24, 1915.
1,182,648.
Patented May 9, 1916.
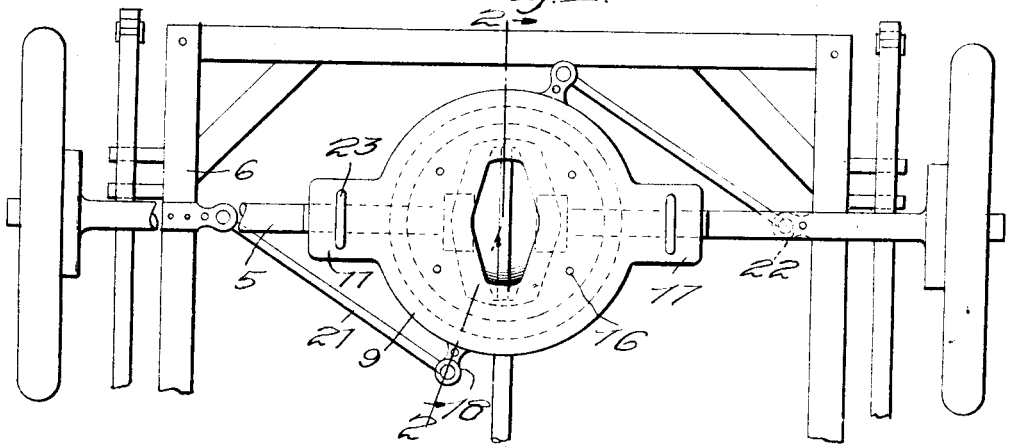
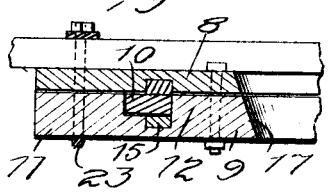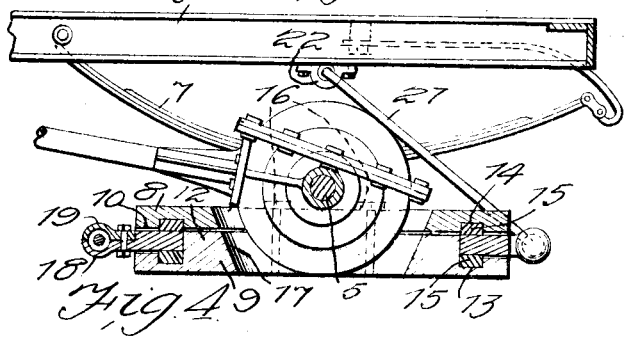
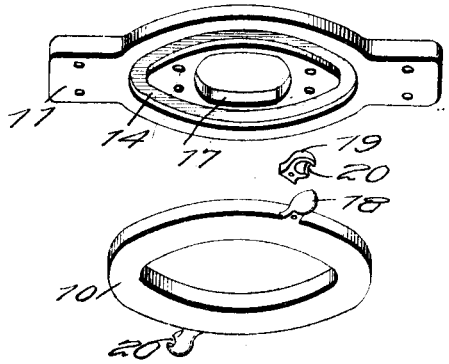
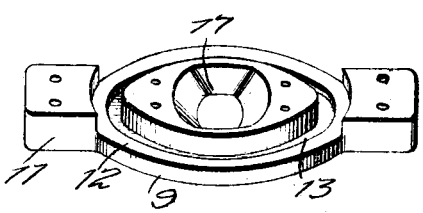
WITNESSES:
J. F. Phillips
Alvin F. Garner
INVENTOR
George W. Cooper,
BY Munn & Co.
ATTORNEYS

UNITED STATES PATENT OFFICE.

GEORGE WASHINGTON COOPER, OF PERRY, OKLAHOMA.

SHOCK-ABSORBER.

1,182,648. Specification of Letters Patent. Patented May 9, 1916.

Application filed September 24, 1915. Serial No. 52,368.

*To all whom it may concern:*

Be it known that I, GEORGE W. COOPER, a citizen of the United States, and a resident of Perry, in the county of Noble and State of Oklahoma, have invented a certain new and useful Improvement in Shock-Absorbers, of which the following is a specification.

This invention relates to an improvement in shock absorbers and spring tension equalizers, and one of the principal objects of the invention is to provide a device of the class described, adapted to take up and absorb shocks and rebounds imparted to the springs of a vehicle, and to subdue and control the side sway of the springs, thus easing and cushioning the motion of the vehicle and adding greatly to the comfort and enjoyment of its passengers.

Another object of the invention is to provide a device of the class described, in the nature of a friction retained plate or disk, rotatably connected with a fixed element such as an axle, and being coupled by means of arms or rods with the vehicle springs in such manner as to be rotated or shifted against the action of friction upon the depression or swaying movement of one or both springs, whereby to absorb the shocks and rebounds and to equalize the strain on the springs.

A still further object of the invention is to provide a device of the class described which will be extremely simple, durable, efficient in operation, and inexpensive to manufacture.

With these and other objects in view which will become apparent as the description proceeds, the invention resides in the construction, combination, and arrangements of parts hereinafter more fully described and claimed and illustrated in the accompanying drawing in which like characters of reference indicate like parts throughout the several figures, of which—

Figure 1 represents a bottom plan view of a shock absorber constructed according to my invention, showing the same as in place on an automobile. Fig. 2 represents a view in section taken vertically on the plane indicated by the line 2—2 of Fig. 1, looking in the direction indicated by the arrows, and showing the device as right side up. Fig. 3 represents a view in section through one of the extensions. Fig. 4 represents a composite view in perspective showing the members of the device separated.

The device is intended and adapted to be used on vehicles of various kinds, such as road machines, buggies, wagons, trucks, automobiles, carriages, all types of railroad rolling stock, and indeed any vehicle with which it is capable of being used. It is designed to be utilized in connection with various characters and shapes of springs, such as body springs, seat springs, axle springs, and the like. The embodiment shown in the drawing will serve to illustrate the construction and principle of operation of the device.

The fixed element in the nature of a vehicle axle is indicated at 5, and the vehicle body frame is indicated at 6, said body and axle being connected by a suitable spring suspension indicated at 7. Arranged upon the axle is a friction element consisting of upper and lower fixed plates 8 and 9 respectively, embracing a rotatable friction plate 10 between them. The plates 8 and 9 may be circular in formation, as indicated in the drawing, or may be of other desired configuration, and they are each provided at diametrically opposed points with extensions 11. The friction plate or disk 10 likewise is preferably circular in formation and is arranged within a rabbet 12 formed on the upper face of the lower plate around the edge thereof. When in assembled position the friction plate or disk 10 is arranged within the rabbet 12 and the plate 8 is then disposed on top of the disk with the extension 11 of said plate 8 resting upon extension 11 of the lower plate 9. The rabbet 12 is slightly deeper than plate 10 is thick, and arranged in channels 13 and 14 provided respectively in the lower and upper plates 9 and 8, are rings or washers 15 of fiber or other suitable material, and these rings extend slightly beyond the adjacent faces of the plates and frictionally engage against the disk 10 as shown in the drawing.

Extending through openings provided at spaced intervals through the plates 8 and 9 within the space encompassed by the disk 10, is a plurality of lag screws or other suitable adjusting elements 16. The plates 8 and 9 may be adjusted toward or away from the disk 10 for varying the frictional engagement of the fiber washers against the said disk.

The friction device consisting of plates 8, 9, and 10 is, as indicated in the drawing, provided centrally with a conical opening 17 for the reception of the gear housing ordinarily formed on the rear axle casing of an automobile, whereby the device may be connected upon the rear axle of a motor vehicle beneath the same in the manner indicated.

The friction plate 10 is provided at diametrically opposed points and approximately at right angles to the extensions 11 with outwardly projecting ears or lugs 18 which are hollowed or recessed at their upper surface. Upon each of these ears 18 is secured by means of a bolt or other suitable device, a block or plate 19 conforming in shape to the ear 18 and similar to the latter provided on its lower surface with a recess or cavity. The ears and blocks are provided with recessed or cut-away portions 20 extending from the depressions or cavities to the periphery, and into which the inner ends of the rods or bars 21 extend. At their inner ends these bars are each provided with a ball 22 which rests within the socket formed by the ear 18 and block 19. A ball and socket joint is thus provided between the rods and the friction plate 10. These rods as clearly indicated in the drawing, extend in opposite directions, and are inclined upwardly to connect at their outer ends by means of ball and socket joints 22 with the body frame 6. The points at which the rods are connected with the friction plate, lie preferably on opposite sides of a line extending centrally through the friction device and lying parallel with the median line of the vehicle body. The disposition of the connecting points of the friction plate and rod may, of course, be varied and adjusted to suit the conditions in separate instances. It has been found, however, that such an arrangement as I have disclosed, is an advantageous one.

Upon depression of the body frame toward the axle or vice versa, incident to the contact of the vehicle wheels with an obstruction or impediment in the roadway, the outer ends of arm 21 will be shifted downwardly, thus moving the inner ends of the arm toward the central longitudinal line of the vehicle, and hence rotating or shifting the plate 10 against the action of friction, relatively to the stationary plates 8 and 9, and thus the initial shock and subsequent rebound will be absorbed and diminished, and an easy cushioning motion attained. Should one side of the vehicle body be depressed to a greater extent than the other, the strain will be transmitted through the rods and friction device to the other side of the body frame and hence to the spring adjacent the said other side of the body frame, whereby to some degree depress said spring, so that a distribution and equalization of the strain between the spring suspension on each side of the body will result. The device acts similarly in maintaining the springs against undue sidewise sway, caused by the oscillation of the vehicle body relatively to the axle, and hence the side motion and swinging and jerking of the vehicle will be eased, and to a great extent eliminated. Through the extensions 11 at each end of the device, extend suitable elements in the nature of bolts or clips 23, by means of which the device is connected with the axle casing.

Although I have described the preferred embodiment of my invention, I may desire to make such changes in the construction, combination, and arrangement of parts thereof, as do not depart from the spirit of the invention and the scope of the appended claims.

I claim:—

1. In a shock absorber, the combination of spaced elements having spring suspension between them, a friction device connected with one of the elements and consisting of upper and lower stationary plates, an intermediate rotatable friction plate arranged between the upper and lower plates, means disposed between the upper and lower plates and the friction plate for frictionally engaging the latter, means whereby the upper and lower plates may be adjusted relatively to the friction plate for varying the intensity of the frictional pressure thereon, a pair of oppositely disposed upwardly inclined rods, ball and socket joints connecting the inner ends of the rods with the friction plate at diametrically opposed points, and ball and socket joints connecting the outer end of the rod with the other element.

2. In a shock absorber, the combination of spaced elements having springs connecting them, a friction device connected with one element and including a pair of stationary plates, and a rotatable friction plate engaged between them, a pair of oppositely disposed and upwardly inclined rods, ball and socket joints connecting the inner ends of said rods with the friction plate at diametrically opposed points, and ball and socket joints connecting the upper ends of said rods with the other element.

3. In a shock absorber, the combination of spaced elements having cushioning means between them, a friction element fixed with relation to one element and including a movable frictionally retained plate, and a plurality of rods pivotally connected adjacent to their inner ends with the friction plate at diametrically opposed points, and pivotally connected adjacent their outer ends with the other element at spaced points.

4. In a shock absorber, the combination of spaced elements having resilient members connecting them, a friction device connected to one of the elements, said friction device including a frictionally retained plate, and oppositely arranged link elements pivotally connected at their inner ends with the friction plate and pivotally connected adjacent their outer ends with the other element.

5. In a shock absorber, the combination with a pair of spaced elements movable relatively to each other, of a friction element fixedly arranged with respect to one of the spaced elements and including a movable frictionally retained plate, and oppositely extending rigid members connecting the said plate with the other of the spaced elements, restraining said spaced elements against relative lateral movement.

6. In a shock absorber, the combination with a plurality of resiliently spaced elements, of a frictionally retained movable plate held against lateral movement with respect to one of the resiliently spaced elements, and means connecting the plate with the other resiliently spaced element at a plurality of points.

GEORGE WASHINGTON COOPER.

Witnesses to signature:
W. E. RICE,
HENRY S. JOHNSTON.